INVENTORS
JAMES B. GODSHALK
EMORY S. LOWRY
BY Stone, Boyden & Mack,
ATTY'S.

June 14, 1955  J. B. GODSHALK ET AL  2,710,937
METHOD AND APPARATUS FOR HEATING BATTERIES
Filed Nov. 3, 1952  2 Sheets-Sheet 2

INVENTORS
JAMES B. GODSHALK
EMORY S. LOWRY
BY Stone, Boyden & Mack,
ATTYS.

United States Patent Office 2,710,937
Patented June 14, 1955

2,710,937

METHOD AND APPARATUS FOR HEATING BATTERIES

James B. Godshalk, Philadelphia, and Emory S. Lowry, Feasterville, Pa., assignors to Fox Products Company, Philadelphia, Pa., a corporation of Pennsylvania Application November 3, 1952, Serial No. 318,423

11 Claims. (Cl. 320—2)

This invention relates to the heating of electrical batteries, and particularly to a method and apparatus for maintaining the internal temperature of a storage battery within a desired range when the battery is used in an especially cold environment.

Storage batteries may be successfully discharged at temperatures as low as —60° F. However, at unusually low temperatures, storage batteries will not accept a charge electrochemically. The particular temperature at which a battery cannot be charged depends upon the specific gravity of the electrolyte; the lower the specific gravity, and therefore the state of charge, of the battery, the higher will be the temperature below which charging cannot be carried out. Since the battery will deliver current, but cannot be recharged, at unusually low temperatures, a battery used at such temperatures tends to become discharged until the specific gravity of the battery is so low that the battery will freeze solid, resulting in permanent damage to the plates and casing. And, even if this does not occur, an attempt to charge the battery may result in injurious "frothing" or "boiling" of the electrolyte if automatic regulation of the charging voltage is not provided for. These conditions are particularly important where storage batteries are employed in military vehicles operated in particularly cold climates, and for such applications there has long been a need for an apparatus which will maintain the internal temperature of a battery at such a level that the battery can be successfully charged. Moreover, the conditions of use for such vehicles dictate that a battery heater, or heat maintainer, if it is to be successful in meeting field requirements, should need no source of power exterior to the vehicle in which the battery is used.

We have discovered that a battery subjected to unusually cold environments can be maintained at an operable temperature by employing the battery itself as a source of power for the generation of alternating current, and passing the alternating current through the battery to heat the same by reason of its internal resistance. Thus, in accordance with the present method, we draw a direct current from the battery to be heated, convert this current to alternating current, and pass the alternating current back through the battery. While it would appear that such a method would result in so great a drain on the battery as to be impractical, we have discovered that this method will maintain conventional storage batteries at operable temperatures for periods on the order of 24 hours without reducing the energy level of the battery below the minimum point at which the battery will operate starter motors and like direct current powered devices employed in military vehicles.

One object of the invention is to provide a method and apparatus for maintaining batteries serviceable in unusually cold environments by passing through the battery an alternating current derived from the battery itself as a source of power.

Another object is to provide a battery heat maintainer in which two batteries are connected in parallel aiding in a discharge circuit, a D. C.-A. C. converting means is connected to the discharge circuit so as to be powered by the two batteries, and the alternating current output of the converting means is fed to the batteries through a heating circuit in which the batteries are connected in series bucking so as to prevent discharge of the batteries through the heating circuit.

A further object is to provide a twin battery heat maintainer in which current is drawn alternately from the two batteries, and an alternating heating current derived from current pulses so produced.

Yet another object is to provide a battery heater in which the battery being heated is employed as a source of power to develop an alternating heating current, and including thermal control means responsive to the internal temperature of the battery to initiate and terminate the direct current discharge from which the alternating heating current is derived.

In order that the invention may be understood in detail, reference is had to the accompanying drawings which form a part of this specification and in which.

Figure 3:
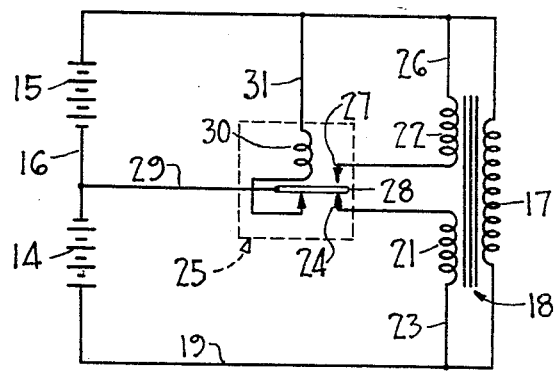
Figure 4:
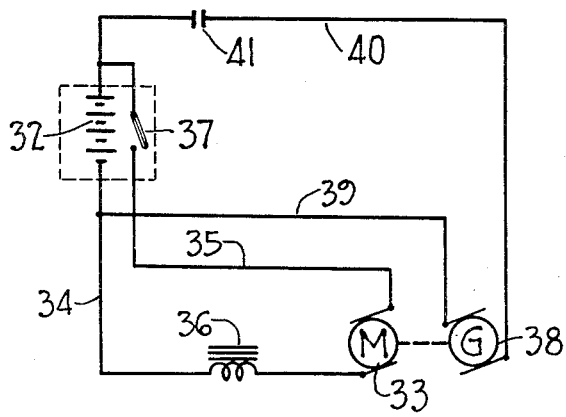

Fig. 3 is a circuit diagram of a twin battery heater constructed in accordance with the invention and wherein the batteries are discharged alternately to provide current pulses from which the alternating heating current is derived; and Fig. 4 is a circuit diagram illustrating another form of apparatus constructed in accordance with the invention and including thermal control means responsive to the internal temperature of the battery being treated.

Figure 1:
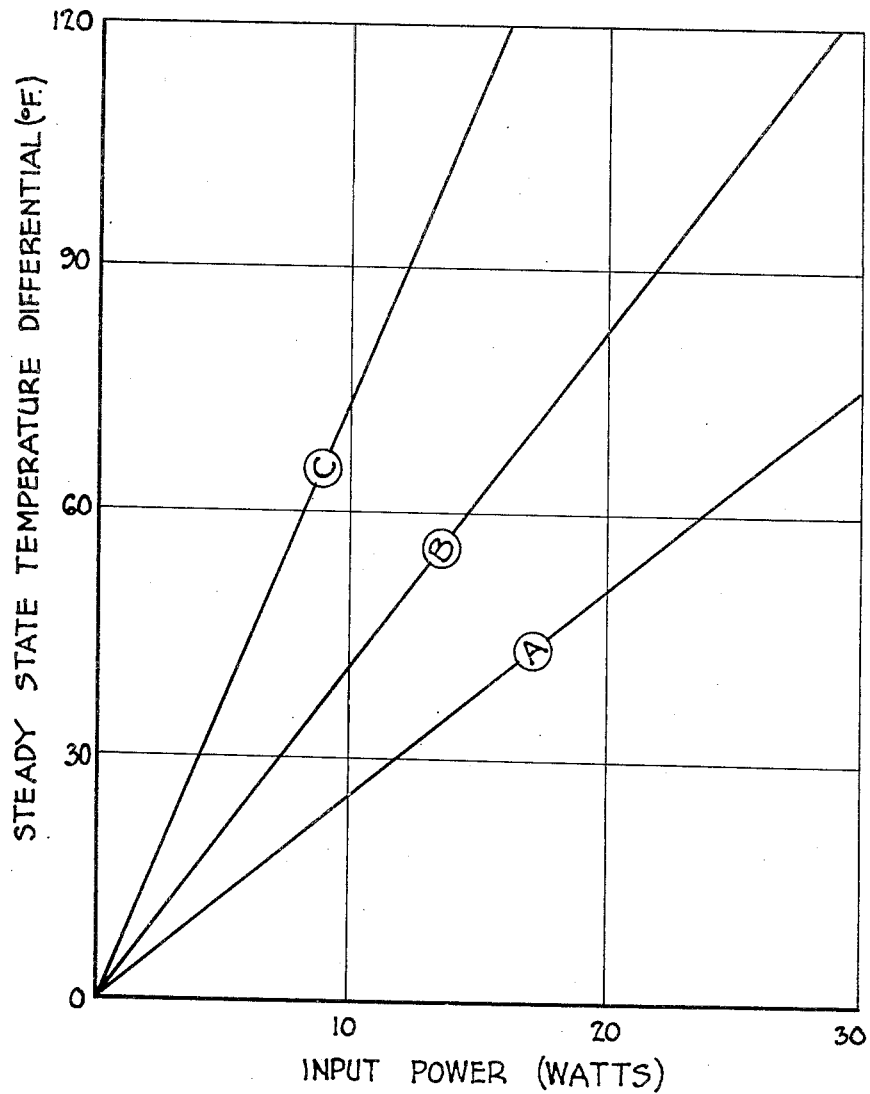
Fig. 1 is a graph illustrating the effectiveness of our method for maintaining batteries at operable temperatures.

Referring now to Fig. 1, the graph there shown illustrates the relationship between steady state temperatures differential (that is, the differential between ambient temperature and internal battery temperature) and input power for a typical test battery, and indicates the general range of temperature differentials which may be attained with the alternating current derived from the battery as a power source. Where the battery under consideration is a storage battery of the general type now employed in military vehicles, a power input up to 30 watts may be used for time periods on the order of 12–16 hours, and the data for Fig. 1 was accordingly derived from tests in this power range.

The battery from which the data for Fig. 1 was derived was a commercially-available lead-acid storage battery equipped with varying amounts of thermal insulation. In the test represented by curve A, the terminals and cell connector straps were insulated, as well as the cables connected to the battery, but no insulation was provided about the battery proper other than the standard casing for the battery. Ambient temperature for this test run was maintained at —93° F. In the test represented by curve B, the battery was placed in an insulated box, but no thermal insulation was employed on the cables. Ambient temperature was held at —16° F. In the test represented by curve C, both an insulating box for the battery and insulation on the cables were employed. Ambient temperature was held at —53° F.

It will be noted from curve C that the invention makes it possible to maintain a 120° F. differential between the ambient and battery temperatures with an alternating current power input of 17 watts, for the particular type of battery tested. Thus, if 30° F. is the minimum operable battery temperature, such a battery temperature could be maintained by the present invention even though the ambient temperature should be on the order of —90° F. Of course, in any specific case, the necessary power input will depend upon the heat loss characteristic of the battery and the amount of thermal insulation employed.

Figure 2:
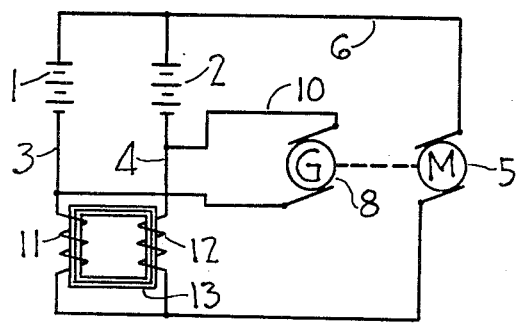
Fig. 2 is a circuit diagram illustrating one embodiment of an apparatus constructed in accordance with the invention.

Turning now to the apparatus embodiments of the invention, Fig. 2 illustrates a simple form of twin battery heat maintainer by which the method may be carried out. The batteries 1 and 2 are connected in the parallel branches 3 and 4, respectively, and a direct current motor 5 is connected in series with this parallel circuit by conductors 6 and 7, so that the batteries are connected in parallel aiding to supply current to energize the motor. The motor 5 drives a suitable alternating current generator 8, and the output of the generator is connected across the parallel branches 3 and 4 by conductors 9 and 10. Thus, while the batteries are connected to discharge in parallel aiding, they are connected to the output of the generator 8 in series bucking. Since the batteries are opposed in the heating circuit, and are of normally substantially equal voltage, there can be no material discharge of the batteries through the heating circuit.

In series with the battery 1 in branch 3 there is connected a choke coil 11. Similarly, a choke coil 12 is connected in series with the battery 2 in branch 4. The coils 11 and 12 are wound on a common core 13 and are so connected in the parallel branches 3 and 4 that the magnetomotive forces produced by the two coils during the flow of pulsating direct current from the batteries are opposed and cancel each other, so that as to this current flow the coils 11 and 12 constitute balanced chokes. It will be noted that the conductors 9 and 10 are connected to the junctions between the battery 1 and coil 11 and the battery 2 and coil 12, respectively. Thus, alternating current from the generator 8 must pass through the two coils in series, and the coils are so connected that during the flow of alternating current from the generator the magnetomotive forces produced by the coils are additive, and the inductance is then maximum. Were it not for the balanced chokes 11 and 12, the alternating current source 8 would be shorted through the parallel branches 3 and 4. But, since the balanced chokes present a high inductance for alternating current, such shorting is prevented, yet the efficiency of the apparatus in supplying discharge currents from the batteries is not greatly reduced.

In this embodiment, the batteries 1 and 2 in parallel aiding supply direct current via conductors 6 and 7 to the motor 5. The motor 5 drives the generator 8, which supplies alternating heating current to the batteries in series bucking via conductors 9 and 10 and branches 3 and 4.

Fig. 3 illustrates another form of twin battery heat maintainer in which current is drawn alternately from the two batteries. The batteries 14 and 15 are connected in series opposition by conductor 16, and the secondary winding 17 of a transformer 18 is connected across the series combination of the two batteries by conductors 19 and 20. The transformer 18 includes two equal primaries 21 and 22, the primary 21 being connected by conductor 23 between the inertia contact 24 of a vibrating reed converter 25 and conductor 19. The primary 22 is connected by conductor 26 between the pull interrupter contact 27 of the converter 25 and conductor 20. The reed 28 of the converter is connected via conductor 29 to the junction between the two batteries 14 and 15, and the actuating coil 30 of the converter is connected between the reed and conductor 20 via conductor 31.

With the reed 28 engaging the contact 24, current may pass from the battery 14 via conductors 29, 23 and 19 to energize the primary 21. Similarly, when the reed 28 engages the contact 27, current from the battery 15 energizes the primary 22. Since the batteries are connected back-to-back, current flow in the two primary windings is opposed. The operation of the vibrator 25 is otherwise conventional, so that the contacts 24 and 27 are alternately closed at a frequency depending upon the design of the vibrator. The opposed direct current pulses thus provided to energize the primary windings result in an induced alternating electromotive force in the secondary winding 17. Since the secondary 17 is connected across the series combination of the batteries 14 and 15 by the conductors 19 and 20, the alternating current resulting in the secondary 17 passes through the batteries in series to heat the same. The batteries being of normally equal voltage and connected in opposition, there is no material battery discharge through the heating circuit and the secondary winding 17.

A heat maintainer involving only a single battery is shown in Fig. 4. Here, the battery 32 to be maintained at an operable temperature is connected to a direct current motor 33 by conductors 34 and 35, the conductor 34 including a suitable choke 36 and the conductor 35 including a thermally responsive switch 37. The switch 37 may be any conventional type suitable for insertion within the battery 32 so as to be subjected to the internal temperature of the battery, and is constructed to open at a predetermined temperature, such as 30° F., at which the battery will be serviceable, and to close when the temperature falls below such value. Thus the motor 33 will be energized from the battery 32 whenever the internal temperature of the battery falls to a value at which the switch 37 closes.

The motor 33 drives an alternating current generator 38, and the output of the generator is connected across the battery 32 by conductors 39 and 40. A condenser 41 is connected in series with the generator and battery as shown.

In operation, alternating current supplied by the generator 38 passes through the battery to heat the same, but is excluded from the motor circuit by reason of the choke 36. While the battery can discharge through conductors 34 and 35 to power the motor, direct current from the battery is excluded from the heating circuit by the presence of condenser 41. Since the switch 37 is closed only when the battery temperature is below the predetermined minimum operable temperature, current is drawn from the battery only when the heating action is required to maintain the desired temperature.

We claim:

1. The method for maintaining a storage battery serviceable in exceptionally cold environments comprising the steps of drawing a direct current from the battery, converting said direct current to alternating current, and passing said alternating current through the battery to heat the same.

2. In an apparatus for maintaining a battery serviceable in exceptionally cold environments, the combination of a discharge circuit for drawing a direct current from the battery, a D. C.–A. C. converter having its input connected in said discharge circuit, a heating circuit connected to supply the output of said converter to the battery to heat the same, and means in said heating circuit for preventing effective discharge of the battery through the heating circuit.

3. In an apparatus for maintaining a storage battery serviceable in exceptionally cold environments, the combination of a discharge circuit for drawing a direct current from the battery, a direct current motor connected in said discharge circuit, an alternating current generator driven by said motor, a heating circuit connected to the output of said generator for supplying alternating current therefrom to the battery to heat the same, and means in said heating circuit for preventing effective discharge of the battery through the heating circuit.

4. In an apparatus for maintaining a storage battery serviceable in exceptionally cold environments, the combination of a discharge circuit for drawing a direct current from the battery, a vibrating reed type converter having its input connection in said discharge circuit, a heating circuit connected to the output of said converter for supplying alternating current therefrom to the battery to heat the same, and means in said heating circuit for preventing effective discharge of the battery through the heating circuit.

5. In combination, a pair of storage batteries connected in series opposition, a transformer including a secondary winding, a heating circuit connecting the secondary winding of said transformer across the series combination of said batteries, and discharge circuit means for alternately supplying current from first one and then the other of said batteries to energize the primary of said transformer.

6. In combination, a pair of storage batteries connected in series opposition, means for drawing pulses of direct current alternately from said batteries, means including a transformer energized by such pulses to derive an alternating current therefrom, and circuit means connected to pass said alternating current through the series combination of said batteries.

7. In combination, a pair of storage batteries connected in series opposition; a transformer having two primary windings and a secondary winding; a heating circuit connecting said secondary winding across the series combination of said batteries; a vibrator unit including a driving coil, a reed vibrated by said coil, and a pair of contacts alternately closed by said reed, said driving coil being connected to be intermittently energized from one of said batteries; discharge circuit means connecting one of said primary windings across one of said batteries through one of said contacts when said one contact is closed by said reed, and other discharge circuit means connecting the other of said primary windings across the other of said batteries through the other of said contacts when other contact is closed by said reed.

8. In combination in apparatus of the type described, two storage batteries, discharge circuit means in which said batteries are connected in parallel aiding, heating circuit means in which said batteries are connected in series opposition, and a D. C.–A. C. converter connected to receive direct current from said discharge circuit and supply alternating current to said heating circuit.

9. In combination in apparatus of the type described, two storage batteries, a discharge circuit connecting said batteries in parallel aiding to draw direct current therefrom, converter means connected to said discharge circuit to convert said direct current to alternating current, and a heating circuit connected to the output of said converter means and to said batteries in series opposition to supply said alternating current to said batteries to heat the same without substantial direct current discharge of the batteries through said heating circuit.

10. In an apparatus for maintaining a storage battery serviceable in exceptionally cold environments, the combination of a converter having direct current input terminals and alternating current output terminals, a discharge circuit connected to said input terminals for supplying said converter from the battery, a heating circuit connected to said output terminals for supplying alternating current from said converter to the battery to heat the same, means in said heating circuit for preventing effective discharge of the battery through the heating circuit, and means responsive to the internal temperature of the battery and arranged to interrupt said discharge circuit to terminate the flow of current from the battery to the converter upon occurrence of a predetermined internal temperature of the battery at which the battery is serviceable.

11. In an apparatus for maintaining a storage battery serviceable in exceptionally cold environments, the combination of a converter having direct current input terminals and alternating current output terminals, a discharge circuit connected to said input terminals for supplying said converter from the battery, thermally controlled switching means including a thermally responsive element constructed for insertion in the battery and contacts in said discharge circuit in series with the battery, said switching means maintaining said contacts normally closed and opening the same upon occurrence of a predetermined internal temperature of the battery at which the battery is serviceable, a heating circuit connected to said output terminals for supplying alternating current from said converter to the battery to heat the same, and means in said heating circuit for preventing effective discharge of the battery through the heating circuit.

References Cited in the file of this patent

UNITED STATES PATENTS

| | | |
|---|---|---|
| 732,616 | Burgess et al. | June 20, 1903 |
| 982,493 | Hickley | Jan. 24, 1911 |
| 1,266,780 | Edison | May 21, 1918 |
| 1,363,889 | Linebarger | Dec. 28, 1920 |
| 2,354,877 | Peters | Aug. 1, 1944 |
| 2,442,380 | Schrodt et al. | June 1, 1948 |
| 2,498,814 | Little et al. | Feb. 28, 1950 |
| 2,516,048 | Endress | July 18, 1950 |